United States Patent [19]

Bizjak et al.

[11] Patent Number: 4,860,251

[45] Date of Patent: Aug. 22, 1989

[54] VERTICAL BLANKING STATUS FLAG INDICATOR SYSTEM

[75] Inventors: Karl Bizjak, Portola Valley; Michael Shantz, Sunnyvale; Linda Shwetz, Menlo Park, all of Calif.

[73] Assignee: Sun Microsystems, Inc., Mountain View, Calif.

[21] Appl. No.: 931,663

[22] Filed: Nov. 17, 1986

[51] Int. Cl.[4] .......................... G06F 13/00; G06F 3/14

[52] U.S. Cl. ...................................... 364/900; 340/744

[58] Field of Search ... 364/200 MS File, 900 MS File, 364/900; 340/744

[56] References Cited

U.S. PATENT DOCUMENTS

| | | | |
|---|---|---|---|
| 3,988,534 | 10/1976 | Sacks | 358/126 |
| 4,064,561 | 12/1977 | Jennings | 364/900 |
| 4,156,904 | 5/1979 | Minowa et al. | 364/200 |
| 4,270,125 | 5/1981 | Weisbecker | 340/744 |
| 4,303,986 | 12/1981 | Lans | 364/900 |
| 4,342,991 | 8/1982 | Pope et al. | 340/744 |
| 4,516,170 | 5/1985 | Skerlos | 358/191.1 |
| 4,535,357 | 8/1985 | Penney | 358/150 |
| 4,546,350 | 10/1985 | Tanaka | 340/744 |
| 4,567,521 | 1/1986 | de la Guardia et al. | 358/150 |
| 4,574,302 | 3/1986 | MacKereth | 358/150 |
| 4,673,930 | 6/1987 | Bujalski et al. | 340/703 |
| 4,679,080 | 7/1987 | Bashford et al. | 358/150 |
| 4,697,207 | 9/1987 | Lilley | 358/17 |
| 4,697,211 | 9/1987 | Balaban et al. | 358/153 |

*Primary Examiner*—Thomas M. Heckler
*Assistant Examiner*—Viet O. Nguyen
*Attorney, Agent, or Firm*—Blakely Sokoloff

[57] ABSTRACT

An improved display system which includes a central processing unit (CPU) coupled to a display utilizing vertical blanking intervals. A frame buffer memory is coupled to the CPU for storing data representative of color indices for each display pixel. The frame buffer is further coupled to look-up tables (LUTs) for storing color values which are provided through digital/analog converters (DACs) to the display. The CPU updates the contents of the frame buffer and/or LUTs during the vertical blanking interval of the display. A "first half" status flag is provided to the CPU at the beginning of each vertical blanking interval. This status flag remains true until one half of the period has elapsed. A "too late" status flag is also provided at the initiation of the interval which remains low until the end of the vertical blanking interval. The CPU may, based upon when the memory update begins relative to the status flags, determine whether or not to continue the update or terminate until the next vertical blanking interval. Accordingly, system efficiency is significantly increased and display integrity preserved.

7 Claims, 2 Drawing Sheets

VERTICAL BLANKING STATUS FLAG INDICATOR SYSTEM

BACKGROUND OF THE INVENTION

1. Field of the Invention

The present invention relates to the field of computer display systems, and more particularly, to improved apparatus and methods for updating data representative of images to a display system.

2. Art Background

In many computer systems it is quite common to represent and convey information to a user through digital images. These images may take a variety of forms, such as for example, alphanumeric characters, cartesian graphs, and other pictorial representations. In many applications, the digital images are conveyed to a user on a display device, such as a raster scan video monitor, printer or the like. Typically, the images to be displayed are stored in digital form, manipulated, and then displayed.

Many computer systems store data in the form of binary representations of picture elements ("pixels") comprising an image on a display. The data is generally stored in a memory referred to as a "frame buffer" which is coupled to the display. The frame buffer memory used to store representations of each pixel comprising an image is usually in the form of a "bit map". A number of bit maps may be defined within the memory such that color may be associated with each bit map, thereby permitting multi-colored images to be displayed on an appropriate color monitor or the like.

The frame buffer memory is typically "dual ported" to permit the CPU to update data comprising an image being displayed. The CPU is often required to first read data from the dual ported frame buffer and then internally modify the data to form an appropriate binary representation of the new image to be displayed. This updated data is then written back into the frame buffer such that it may be accessed through another memory port of the particular display device for subsequent display. In the case where the video memory is not dual ported, the CPU may only update the contents of the frame buffer during the vertical blanking interval of the display system.

In most color display systems, a secondary stage is used to translate bit plane information into an analog output level capable of driving a color monitor or the like. A look-up table (LUT) is used for this translation, and contains a "color map" storing intensity levels corresponding to all possible combinations of bit map entries in the frame buffer. LUTs are generally not dual ported, such that the CPU may only update the color map contained therein during the time in which the display is blank; otherwise, a visible "glitch" will appear on the display.

In most computer display systems, the CPU is notified through use of an interrupt, at the beginning of a vertical blanking interval. The CPU may then initiate its update cycle to modify data within the frame buffer of LUT, such that it is displayed at the conclusion of the vertical blanking interval. However, the updating of the display may have a lower priority than other CPU functions, and consequently, the CPU may not actually begin the update cycle until well into the vertical blanking interval. Accordingly, insufficient time may exist during the vertical blanking interval to accomplish the updating of the display.

As will be disclosed, the present invention provides a unique system of status flags that the CPU may read to determine the time remaining within the vertical blanking interval. The present invention's use of status flags indicates to the CPU the halfway point of the vertical blanking interval, as well as if it is too late for the CPU to begin an update cycle.

SUMMARY OF THE INVENTION

An improved display system is disclosed which includes a central processing unit (CPU) coupled to a display utilizing vertical blanking intervals. A frame buffer memory is coupled to the CPU for storing data representive of color indices for each display pixel. The frame buffer is further coupled to look-up tables (LUTs) for storing color values which are provided through digital/analog converters (DACs) to the display. The CPU updates the contents of the frame buffer and/or LUTs during the vertical blanking interval of the display. A "first half" status flag is provided to the CPU at the beginning of each vertical blanking interval. This status flag remains true until one half of the period has elapsed. A "too late" status flag is also provided at the initiation of the interval which remains low until the end of the vertical blanking interval. The CPU may, based upon the state of the status flags, determine whether or not to begin or continue the update or terminate until the next vertical blanking interval. Accordingly, system efficiency is significantly increased and display integrity preserved.

DETAILED DESCRIPTION OF THE INVENTION

An improved display system is disclosed having particular application for use by a digital computer to provide high speed graphics capability. In the following description, for purposes of explanation, numerous details are set forth such as specific memory architectures, data paths, etc., in order to provide a thorough understanding of the present invention. However, it will be apparent to one skilled in the art that these specific details are not required to practice the present invention. In other instances, well known electrical structures and circuits are shown in block diagram form in order not to obscure the present invention unnecessarily.

Figure 2:
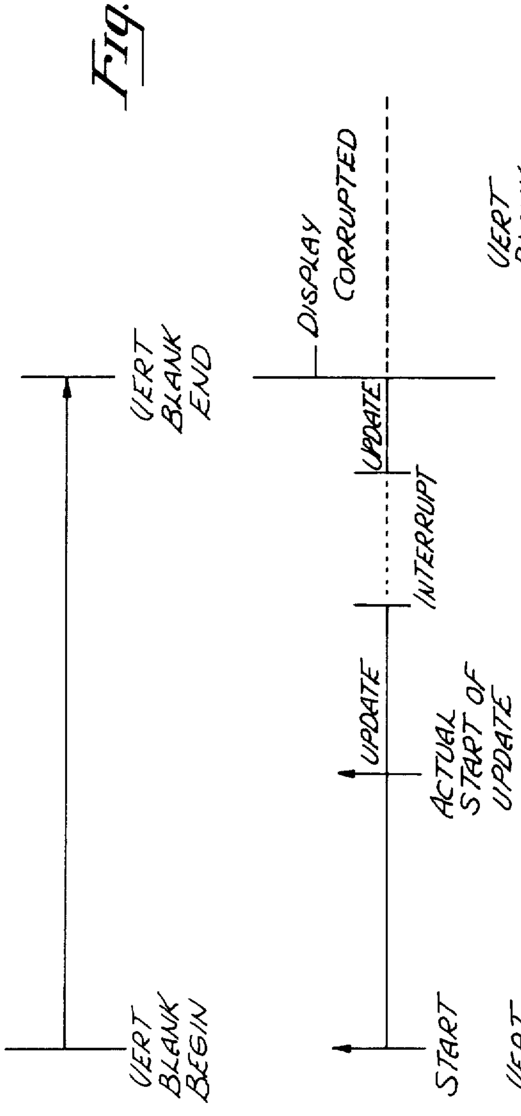
FIG. 2 illustrates the beginning and end of the vertical blanking interval.

Referring briefly to FIG. 2, in most prior art computer display systems, a central processing unit (CPU) updates a frame buffer memory or a look-up table (LUT), coupled to a display system during the vertical blanking interval of the display. The CPU is notified of the initiation of a vertical blanking interval through an interrupt, and upon receipt of such notification, may then proceed with the updating of the frame buffer memory or LUT. However, due to system time lags as well as other tasks having a higher priority than the memory or LUT update operation, the actual beginning of the update may not take place until well within the vertical blanking interval. Since the CPU may, at any time during the update, be interrupted by higher priority vectors, the actual update cycle during the vertical blanking interval may be interrupted such that the complete update cannot be completed during the vertical blanking interval. As will be described, the present invention provides apparatus and methods for generating status flags to notify the CPU if sufficient time exists for a memory update during the vertical blanking interval.

Figure 1:
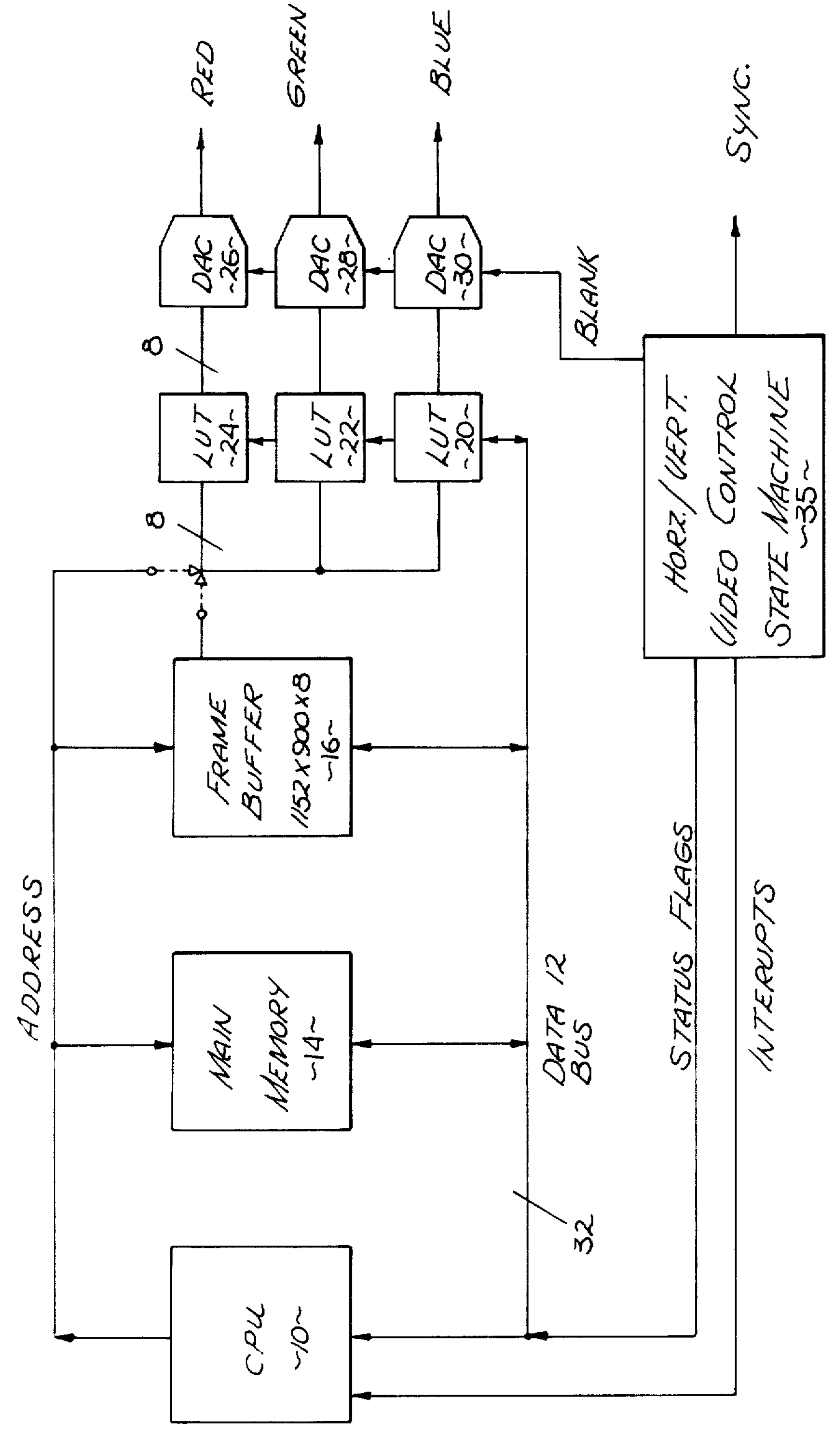
FIG. 1 is a block diagram of a computer display system incorporating the teachings of the present invention.

Referring now to FIG. 1, a computer display system incorporating the teachings of the present invention is disclosed. Although the present invention is illustrated with reference to the embodiment disclosed in FIG. 1, it will be appreciated by one skilled in the art that the teachings of the present invention may be incorporated into a variety of computer display systems. As illustrated, a CPU 10 is coupled along a data bus 12 to a main memory 14 and a frame buffer 16. In the present embodiment, data bus 12 comprises a 32 bit wide parallel bus to permit the transfer of data to and from CPU 10. Main memory 14 incorporates, in the present embodiment, dynamic random access memories (DRAMs) for storing programs and data for use by the CPU 10. As illustrated, data bus 12 is further coupled to look-up tables (LUTs) 20,22 and 24. The LUTs 20,22,24 are coupled to the frame buffer 16, and as illustrated, each of the LUTs are coupled to digital to analog converters (DACs) 26 through 30. As will be described, the output from each DAC corresponds to a unique color signal which is provided to a display monitor (not shown).

In the present embodiment, frame buffer 16 comprises an $1152 \times 900 \times 8$ D-RAM memory wherein each pixel on the display is represented by an 8 bit word. Each 8 bit word within frame buffer 16 comprises a color index for that particular corresponding pixel. The output of frame buffer 16 is provided to each LUT, wherein each look-up table includes color values which correspond to the color indices provided by the frame buffer 16. These color values are then coupled to the corresponding DAC where they are converted to analog signals and transmitted to the display. As will be described, the contents of each LUT may be altered by the CPU 10 during the vertical blanking interval to modify the color values. This feature of the present invention permits non-corrupted color map animation effects to be achieved.

Horizontal/vertical video control state machine 35 is coupled to the data bus 12, and provides synchronization signals to the display as well as interrupts, and, as will be described, status flags to the CPU 10. State machine 35 issues appropriate commands to frame buffer 16, such that the image to be displayed is continuously "painted" from the frame buffer through the respective LUTs and DACs to the display. Moreover, state machine 35 initiates and terminates the vertical blanking interval and generates an interrupt to microprocessor 10, thereby notifying the microprocessor that the update cycle may begin.

Figure 3:
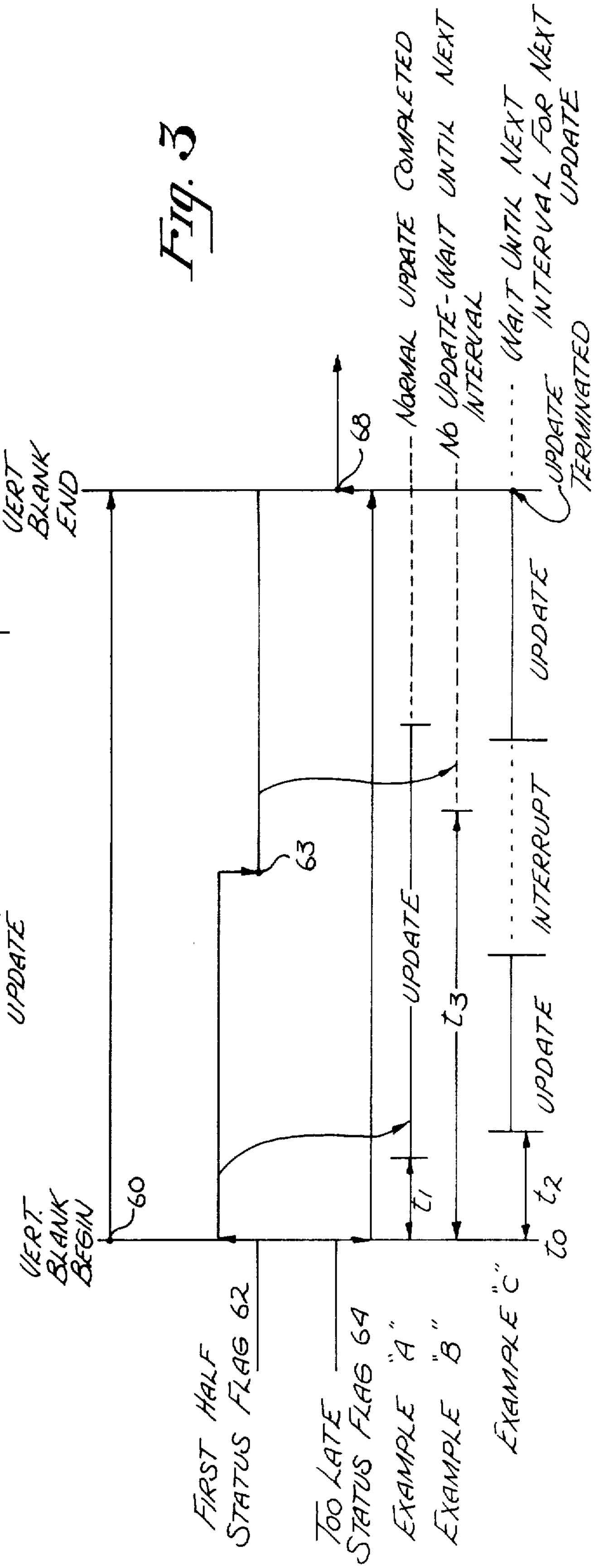
FIG. 3 is a timing diagram illustrating the present invention's use of status flags to identify time periods within the vertical blanking interval.

Referring now to FIG. 3, state machine 35 begins the vertical blanking interval at a point 60. State machine 35 generates a "first half" status flag 62 at the beginning of the vertical blanking interval. The status flag 62 is coupled to CPU 10 and may take the form of unique data bits transmitted along data bus 12, dedicated lines coupled directly to the microprocessor, or other similar signals notify the CPU 10 of the initiation of the vertical blanking interval. Upon receipt of the first half status flag 62, CPU 10 may begin updating the contents of frame buffer 16 and/or the contents of the LUTs. Similarly, a "too late" status flag 64 is provided to CPU 10 and, as illustrated, this signal remains low until the end of the vertical blanking interval defined by point 68 in the drawings. In the present embodiment, first half status flag 62 is terminated (point 63) after one-half of the vertical blanking interval period has passed. The changing of the state of status flag 62 indicates to the CPU 10 that half of the blanking interval has passed, and that updates to the frame buffer and/or LUT memories should not be initiated past this point.

As illustrated in Example "A" of FIG. 3, in a typical ("normal") update cycle, state machine 35 issues a first half status flag 62 upon the initiation of the vertical blanking interval. After a time $t_1$, following a vertical interrupt, from state machine 35, CPU 10 begins the updating of data within the frame buffer 16 and/or LUT memories. The update completes within the vertical interval and the display is not affected. In Example "C", CPU 10 again begins the update after a time $t_2$ in the blanking interval. Due to other tasks having higher priority, the CPU may be interrupted for some period of time during the vertical blanking interval, thereby suspending the updating of the memories. Once CPU 10 has completed the higher priority tasks, it may then proceed with the completion of the update cycle within the vertical blanking interval. As the update continues, CPU 10 now monitors the "too late" flag, which causes it to suspend the update at the end of the blanking interval such that display integrity is preserved. In the final example ("B"), time $t_3$ expires within the blanking interval before CPU 10 begins the actual update cycle. CPU 10 detects the "first half" status flag and determines that an update cycle will not complete within the vertical interrupt period. The CPU then postpones the initiation of an update cycle until the next blanking interval. It will be appreciated by one skilled in the art that although the first half status flag 62 is provided from the initiation of the vertical blanking interval until the halfway point through the interval, that in other applications it may be advantageous to provide multiple status flags throughout the interval or, rather, provide a status flag at other predetermined periods within the vertical blanking interval.

Accordingly, an improved display system is disclosed having particular application for use by a digital computer to provide efficient graphics displays.

We claim:

1. An improved computer display system including a central processing unit (CPU) coupled to a display having vertical blanking intervals, comprising:
   - memory means coupled to said CPU and said display for storing a plurality of data points representative of display elements defining images to be displayed on said display;
   - said CPU updating said data points stored in said memory means during said vertical blanking interval of said display;
   - video control means coupled to said display and said CPU for providing a first status flag to said CPU having a first state during a predetermined initial period of said vertical blanking interval and a second state at all other times;
   - said video control means further providing a vertical interrupt signal to said CPU to initiate said updating of said data points;

wherein said CPU initiates updating of said data points if said vertical interrupt signal is received when said first status flag is in said first state and delays initiating updating of said data points if said vertical interrupt signal is received when said first status flag is in said second state.

2. The computer display system as defined by claim 1, wherein said video control means further provides a second status flag to said CPU having a third state during said vertical blanking interval and a fourth state at all other times;

wherein said CPU suspends said update of said data points when said second status flag is in said fourth state.

3. The computer display system as defined by claim 2, wherein if said CPU initiates the updating of said data points during the current vertical blanking interval and there is insufficient time to complete said update during the current vertical blanking interval, said update is completed during the next vertical blanking interval.

4. The computer display system as defined by claim 2, wherein said predetermined initial period is one half of said vertical blanking interval.

5. The computer display system as defined by claim 3, wherein said memory means includes a frame buffer comprising said plurality of data points corresponding to each display element on said display, and a plurality of look-up tables (LUTs) coupled to said frame buffer.

6. The computer display system as defined by claim 5, wherein the output of said frame buffer is coupled to each of said LUTs, each of said LUTs providing a binary value corresponding to a color to be displayed by said display elements, each of said binary values being provided to a digital to analog coverter (DAC), said DACs being coupled to said display.

7. The computer display system as defined by claim 6, wherein three LUTs are coupled to said frame buffer, each of said LUTs having a digital to analog converter (DAC) coupled thereto.

* * * * *